US010082814B2

(12) United States Patent
Zhao et al.

(10) Patent No.: US 10,082,814 B2
(45) Date of Patent: Sep. 25, 2018

(54) METHOD OF OPERATING AN ELECTRICAL FEEDER

(71) Applicant: COOPER TECHNOLOGIES COMPANY, Houston, TX (US)

(72) Inventors: Dongbo Zhao, Woodbury, MN (US); Yigang Wang, Maple Grove, MN (US); Chinmaya Baburao Patil, South Lyon, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 134 days.

(21) Appl. No.: 15/059,405

(22) Filed: Mar. 3, 2016

(65) Prior Publication Data

US 2017/0255216 A1 Sep. 7, 2017

(51) Int. Cl.
| | |
|---|---|
| *H02J 1/00* | (2006.01) |
| *G05F 1/625* | (2006.01) |
| *H02J 3/16* | (2006.01) |
| *H02J 3/38* | (2006.01) |
| *H02J 13/00* | (2006.01) |
| H02J 3/00 | (2006.01) |

(52) U.S. Cl.
CPC .......... *G05F 1/625* (2013.01); *H02J 1/00* (2013.01); *H02J 3/16* (2013.01); *H02J 3/382* (2013.01); *H02J 13/0006* (2013.01); *H02J 2003/007* (2013.01)

(58) Field of Classification Search
CPC ..... G05F 1/625; H02J 3/14; H02J 3/16; H02J 3/18; H02J 3/382; H02J 3/385
USPC ................................................ 307/31, 34, 38
See application file for complete search history.

(56) References Cited

U.S. PATENT DOCUMENTS

2010/0231042 A1* 9/2010 Weale ..................... H02J 4/00
307/38

FOREIGN PATENT DOCUMENTS

| EP | 2 599 183 A1 | 6/2013 |
|---|---|---|
| JP | 2007 306744 A | 11/2007 |
| WO | 2012/162570 A1 | 11/2012 |
| WO | 2013/028644 A2 | 2/2013 |

(Continued)

OTHER PUBLICATIONS

European Patent Office, "International Search Report and Written Opinion", PCT/US2017/020343, dated Mar. 2, 2017, 13 pp.

*Primary Examiner* — John Poos
(74) *Attorney, Agent, or Firm* — Eckkert Seamans

(57) ABSTRACT

A method of operating an electrical feeder permits the electrical feeder voltage to be maintained at the minimum voltage within a voltage range based upon dynamic grouping together of electrical generators on the electrical feeder with demand response loads on the electrical feeder. A method of assessing the proper operation of a voltage control device on the electrical feeder involves detecting a number of properties of the electrical power in the electrical feeder both prior to and subsequent to a change in an operational parameter of a voltage control device. An expected effect upon the electrical feeder of one or more distributed generators is filtered from this in order to determine a net effect of the voltage control device itself on the electrical feeder. Based upon the detected net effect and a predicted baseline effect for the voltage control device, it can be determined whether the voltage control device is functioning properly.

14 Claims, 4 Drawing Sheets

(56) References Cited

FOREIGN PATENT DOCUMENTS

WO  2014/027246 A2  2/2014

\* cited by examiner

METHOD OF OPERATING AN ELECTRICAL FEEDER

BACKGROUND

Field

The disclosed and claimed concept relates generally to electrical distribution equipment and, more particularly, to a method of operating an electrical feeder to enable improved implementation of conservation voltage reduction thereon.

Related Art

Numerous types of electrical generation and distribution equipment are known in the relevant art. For instance, electricity is purchased by electrical utilities from distant electricity generation entities and is transmitted via high tension lines to intermediate distribution centers such as substations and the like. The electrical power is sent from a substation, for instance, along an electrical conductor known as an electrical feeder, and the electrical power is provided to various loads and other devices that are electrically connected with the electrical feeder.

As is generally understood, electrical power can be said to include real power and reactive power. A purely resistive load such as an electrical resistance wire typically consumes only real power. Other electrical loads such as electric motors or other devices may include inductive load components or capacitive load components or both, and such electrical loads may be said to consume both real power and reactive power.

Since the electrical feeder has numerous types of loads situated at various locations along its length, and the impedance (including both real/active power and reactive components) of the feeder conductor causes voltage drop, the voltage of the real power can vary widely at the various locations along the electrical feeder, as can the availability of reactive power, which is measured in units of var. In order to control the voltage and other aspects of the electrical power on the electrical feeder, the electrical feeder typically has connected therewith a number of voltage control devices that are operable to control the voltage and potentially other aspects of the electrical power on the electrical feeder and can include numerous types of devices. As employed herein, the expression "a number of" and variations thereof shall refer broadly to any non-zero quantity, including a quantity of one. One such device is a voltage regulator, and other such devices include capacitor banks, load tap changers (LTC devices, which perform like a variable transformer), devices such as certain series capacitors, controllable inverters/converters connecting the feeder with energy storage, renewable generators (wind, solar, etc.), or similar source and loads. Such voltage control devices can control the voltage of the electrical power on the electrical feeder and potentially also have the capability to affect the reactive power that is available on the electrical feeder.

The electrical feeder additionally typically has a number of sensors situated thereon or otherwise associated therewith at various locations along its length that provide data via telemetry or via other communication technology to the substation or centralized control center. The substation/control center typically includes a control mechanism that controls the various voltage control devices based upon signals received from the various sensors that are on the electrical feeder and based upon other input. The sensors might provide to the substation data concerning the magnitude and phase angle of both the voltage and the current at that location on the electrical feeder. The control system that is situated at the substation and that controls the various voltage control devices is typically a computerized system that is included in a Distribution Management System (DMS) or a separate system performing similar functions. A DMS normally has a dynamic state engine application deployed and operating thereon. The dynamic state engine detects the various data from the various sensors and provides instructions to the various voltage control devices to adjust the voltage to be at an appropriate level on the electrical feeder.

By way of example, typical domestic electrical power delivery in the United States may be at a nominal value of 120 volts AC at the feeder end, but the voltage is permitted to vary between 114 volts and 126 volts. If a utility employs conservation voltage reduction (CVR), it typically will provide electricity at a voltage that is in the lower end of the acceptable voltage range. Such CVR methodologies are able to reduce the consumption of electrical power by pure resistive loads and by the resistive components of other types of loads. While the provider of electrical power is permitted to maintain the voltage as low as 114 volts in the present example, the provider typically would not operate its electrical feeder at the minimum acceptable voltage since a sudden increase in the electrical load or a sudden drop in distributed electrical generation on the electrical feeder potentially could drive its voltage, at least momentarily, below the acceptable minimum voltage level. As such, CVR is typically implemented at a voltage higher than the minimum voltage in order to provide a buffer zone above the minimum voltage in order to ensure that the voltage never drops below the minimum acceptable voltage. While such systems have been generally effective for their intended purposes, they have not been without limitation.

In recent years, distributed generators such as photovoltaic arrays and wind turbines/farms and the like have become prevalent and are typically connected with electrical feeders. Such distributed generators are generators of electrical power, i.e., electrical generators, and they are known by any of a variety of terms in the relevant art and generate electrical power that is supplied, at least in part, to the electrical feeder to which they are connected. Some of the electrical power that is being generated by the distributed generators may additionally be consumed by a closely related load, such as when a homeowner may install a number of solar panels on the rooftop in order to help generate some of the electricity that is needed in the household. At certain times, all of the electricity that is being generated by such distributed generators might be consumed by closely associated loads, and at other times excess power that is being generated by the distributed generators but that is not being consumed by the closely associated loads is being delivered to the electrical feeder. In the latter situation, the homeowner receives a credit for the electrical power that is supplied to the electrical feeder.

While such distributed generators have been generally desirable to society as a whole, they introduce certain difficulties into the management of electrical feeders because, by their nature, the amount of electrical power that is generated and that is supplied to the electrical feeder can vary. For instance, photovoltaic arrays typically generate electricity at most only during the daytime, and even then the rate at which power is generated depends upon the irradiations level/location of the sun and whether clouds are situated between the sun and the solar panels. Power production with such photovoltaic arrays can vary widely and rapidly on otherwise clear days having separated clouds floating in the sky. With wind generation, the power can vary with the extent to which wind is impinging on the impeller at any given moment. As such, difficulty has be encountered in maintaining the electrical feeder voltage at a given level due to the variable injection of electrical power into the electrical feeder by such distributed generators. Also, difficulty has been encountered in determining whether or not voltage control devices are operating properly since the voltage can be affected by whether or not the distributed generators are supplying electrical power to the electrical feeder. Inasmuch as the addition of such distributed generation devices has increased the complexity of managing an electrical feeder, improvements would be desirable.

SUMMARY

An improved method of operating an electrical feeder permits the electrical feeder voltage to be maintained at the minimum voltage within a voltage range based upon dynamic grouping together of electrical generators on the electrical feeder with demand response loads on the electrical feeder. An improved method of assessing the proper operation of a voltage control device on the electrical feeder involves detecting a number of properties of the electrical power in the electrical feeder both prior to and subsequent to a change in an operational parameter of a voltage control device. The change in such properties between the two times can be referred to as a resultant effect of the electrical feeder. An expected effect upon the electrical feeder of one or more distributed generators is filtered from the resultant effect in order to determine a net effect of the voltage control device itself on the electrical feeder. Based upon the detected net effect and a predicted baseline effect for the voltage control device, it can be determined whether the voltage control device is functioning properly.

Accordingly, an aspect of the disclosed and claimed concept is to provide an improved method of implementing CVR on an electrical feeder that permits the electrical power to be maintained at the minimum allowable voltage within a voltage range.

Another aspect of the disclosed and claimed concept is to provide an improved method of assessing whether or not a voltage control device that is connected with an electrical feeder is operating properly when the electrical feeder additionally has a distributed generator electrically connected therewith.

Accordingly, an aspect of the disclosed and claimed concept is to provide an improved method of assessing from a location the operation of a first device from among a number of first devices that are electrically connected with an electrical feeder and that are operable to control the voltage on the electrical feeder, the electrical feeder additional having a number of second devices electrically connected therewith which generate varying amounts of electrical power that is contributed at least in part to the electrical feeder. The method can be generally stated as including detecting at a first time a number of properties of the electrical power at a number of locations on the electrical feeder, the number of properties can be generally stated as including at least one of a voltage magnitude, a voltage phase angle, a current magnitude, and a current phase angle, issuing from the location at a second time subsequent to the first time an instruction to make a change in an operational parameter of the first device, detecting at a third time subsequent to the second time another number of properties of the electrical power at a number of locations on the electrical feeder, the another number of properties comprising at least one of a voltage magnitude, a voltage phase angle, a current magnitude, and a current phase angle, employing at least a portion of the number of properties and at least a portion of the another number of properties to determine a resultant effect on the electrical feeder between the first and third times, determining an expected effect upon the electrical feeder by at least one second device at the third time based at least in part upon a data set that is in existence prior to the third time, filtering the expected effect from the resultant effect and determining, based at least in part thereon, a net effect on the electrical feeder of the change in the operational parameter the first device, and determining, based at least in part upon a comparison between the net effect and a baseline effect for the first device, whether at the third time the first device is functioning properly.

The measurements are conveyed to the substation/centralized control center where a state estimation engine performs dynamic state estimation to assess the condition of the devices. The concept includes the look-ahead dynamic state estimation using forecasting engine, which in this process enables a comparison between the expected states of the devices with the measured/reported states.

Another aspect of the disclosed and claimed concept is to provide an improved method of operating an electrical feeder on which the voltage is to be maintained between a maximum voltage and a minimum voltage, the electrical feeder having electrically connected therewith a number of first devices which are operable to control the voltage on the electrical feeder, a number of second devices which generate varying amounts of electrical power that is contributed at least in part to the electrical feeder, and a number of third devices which are electrical loads. The method can be generally stated as including grouping a second device of the number of second devices with one or more third devices of the number of third devices, responsive to an increase or a decrease in the amount of electrical power that is being generated by the second device, correspondingly decreasing or increasing, respectively, the consumption of electrical power by the one or more third devices by performing a number of operations that can be generally stated as including at least one of i) adjusting an operating parameter of at least one third device of the one or more third devices to correspondingly decrease or increase, respectively, its power consumption, and ii) further grouping the second device with at least one other third device of the number of third devices to correspondingly decrease or increase, respectively, the aggregate power consumption of the one or more third devices, and operating at least one first device of the number of first devices to maintain the voltage on the electrical feeder at the minimum voltage.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
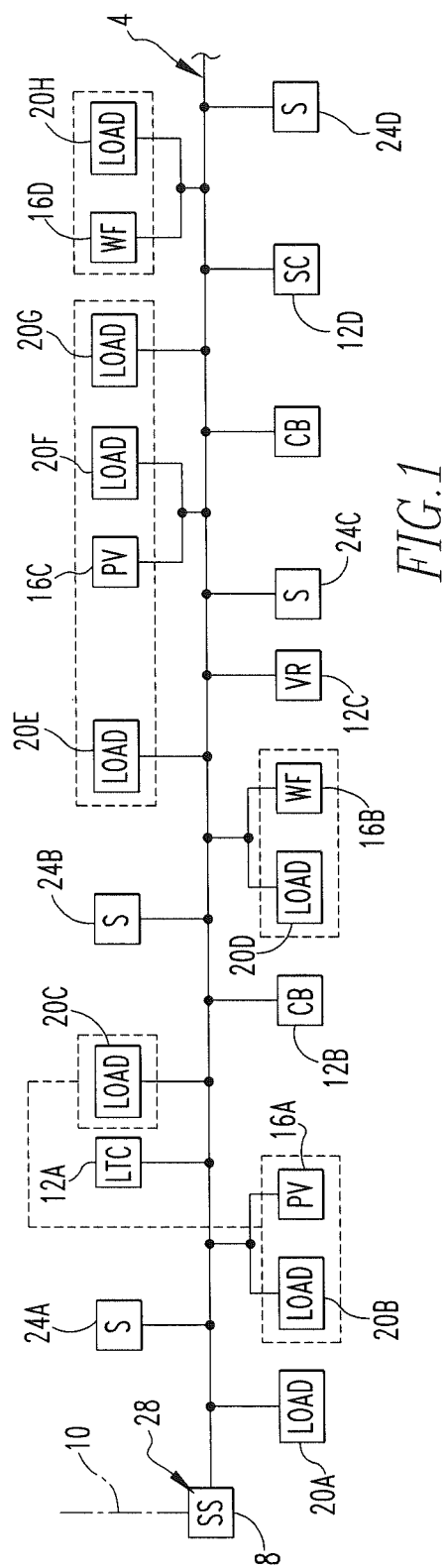
FIG. 1 is a schematic depiction of an electrical feeder upon which an improved method in accordance with the disclosed and claimed concept can be implemented.
Figure 3:
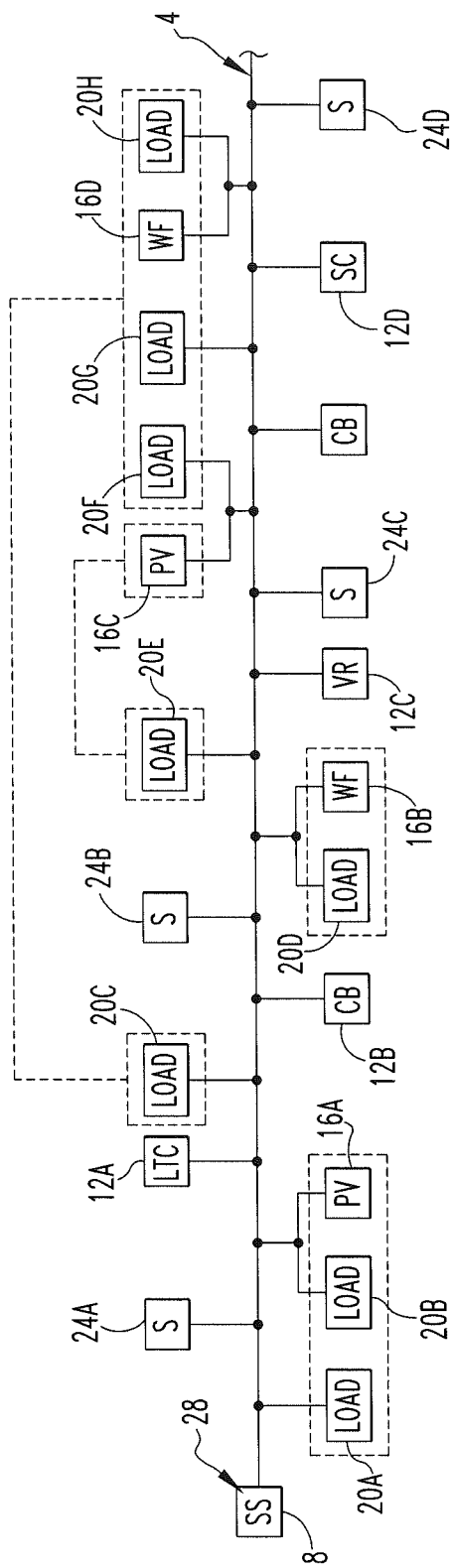
FIG. 3 is another exemplary view of the electrical feeder of FIG. 1.

An exemplary electrical feeder 4 is depicted in FIGS. 1 and 3. The electrical feeder 4 is physically in the form of one or more electrical conductors that conduct electrical power to various electrical loads in a known fashion. FIG. 1 additionally depicts a substation 8 that is electrically connected with the electrical feeder 4 and which serves as a controller that is disposed at a given location and that controls the operation of certain aspects of the electrical feeder 4. As will be set forth in greater detail below, a control apparatus 28 is situated at the substation 8, although the control apparatus 28 could be located in whole or in part at other locations. The control apparatus 28 controls the operation of certain aspects of the electrical feeder 4. The substation 8 is understood to be electrically connected with an electrical utility that provides commercial electrical power to the electrical feeder 4 for distribution to the various electrical loads thereon. The connection between the substation 8 and the electrical utility is depicted at the numeral 10 in FIG. 1.

The electrical feeder 4 has electrically connected therewith a set of voltage control devices that are indicated at the numerals 12A, 12B, 12C, and 12D, and which can be collectively or individually referred to herein with the numeral 12. The voltage control devices 12 are operable by the control apparatus 28 to control the voltage and other properties of the electrical power on the electrical feeder 4. The exemplary control device 12A is a load tap controller, and the exemplary voltage control device 12B is a capacitor bank. The exemplary voltage control device 12C is a voltage regulator, and the exemplary voltage control device 12D is a number of series capacitors. Additionally, the voltage control devices 12 are each in communication with the control apparatus 28 for control and feedback purposes, although such telemetry and data connections are not expressly depicted in FIG. 1 for purposes of simplicity of depiction. It is understood that the aforementioned exemplary voltage control devices 12 are intended merely to represent a number of known voltage control devices that are operable to control the voltage on the electrical feeder 4, and it is thus understood that the instant disclosure is intended to incorporate by reference any type of device known now or in the future that is operable to control the voltage on an electrical conductor.

FIG. 1 also depicts a set of distributed generators that are indicated at the numerals 16A, 16B, 16C, and 16D and that may be collectively or individually referred to herein with the numeral 16. The distributed generators 16 are electrically connected with the electrical feeder 4 and generate electrical power that is supplied, at least in part, to the electrical feeder 4. The distributed generator 16A is a photovoltaic array, as is the distributed generator 16C. The distributed generators 16B and 16D are wind farms that rely upon wind impinging on an impeller that is connected with an electrical generator. Additionally, the distributed generators 16 may be in communication with the control apparatus 28, although such telemetry or data connections are not expressly depicted in FIG. 1 for purposes of simplicity of depiction. The distributed generators 16 are devices which generate electrical power that is, at least in part, provided to the electrical feeder 4, and the exemplary distributed generators 16 depicted herein are merely representative of any of a wide variety of devices that generate electrical power and that can be electrically connected with a conductor. The instant disclosure is thus intended to incorporate by reference any type of electrical generation device that is electrically connectable with an electrical feeder and which can provide electrical power to the electrical feeder.

FIG. 1 additionally depicts a plurality of loads that are indicated generally at the numerals 20A, 20B, 20C, 20D, 20E, 20F, 20G, and 20H, which may be collectively or individually referred herein with the numeral 20. The loads 20 are electrically connected with the electrical feeder 4 and are all or are nearly all demand response loads that may be resistive, inductive, or capacitive, or any combination thereof. Additionally, the loads 20 are each in communication with the control apparatus 28 for control and feedback purposes, although such telemetry or data connections are not expressly depicted in FIG. 1 for purposes of simplicity of depiction. The loads 20 can be any type of item that consumes real or reactive electrical power or both, and the instant disclosure is thus understood to incorporate by reference every type of electrical load known now or in the future.

In the depicted exemplary embodiment, the load 20A is individually and directly connected with the electrical feeder 4, as are the loads 20C, 20E, and 20G. In contrast, the load 20B is connected with the electrical feeder 4 but is additionally connected with and is in one fashion or another associated with the distributed generator 16A. In a like fashion, the load 20D is connected with the electrical feeder 4 and is connected with and is associated with the distributed generator 16B. The load 20F is connected with the electrical feeder 4 and is connected with and is associated with the distributed generator 16C, and the load 20H is connected with the electrical feeder 4 and is connected with and is associated with the distributed generator 16D. In the depicted exemplary embodiment, electrical power that is generated by the distributed generator 16A is first used to provide power to the load 20B. As a general matter, generated electrical power that is in excess of what would be needed to meet the electrical energy requirements of the load 20B would be transmitted into the electrical feeder 4 for consumption by other loads 20. The same can be said of the distributed generators 16B, 16C, and 16D with regard to the loads 20B, 20F, and 20H, respectively.

FIG. 1 further depicts that a set of sensors are installed on the electrical feeder 4 and are indicated generally at the numerals 24A, 24B, 24C, and 24D, which can be collectively or individually referred to herein with the numeral 24. The sensors 24 are situated at various locations along the electrical feeder 4 between certain of the loads 20 and certain of the voltage control devices 12, by way of example. The sensors 24 can be any of a wide variety of devices that are configured to detect electrical properties and, in the exemplary embodiment depicted herein, each include one or more current transformers that are configured to detect the magnitude and phase angle of both the voltage and the current in the electrical feeder 4 at the location where the corresponding sensor 24 is situated. Additionally, the sensors 24 are each in communication with the control apparatus 28 for the communication of data, although such telemetry data connections are not expressly depicted in FIG. 1 for purposes of simplicity of depiction. Any type of sensors may be employed as the sensors 24, and it is thus understood that the disclosure is intended to incorporate by reference any type of device that is capable of detecting properties of an electrical conductor, whether presently known or known in the future.

Figure 2:
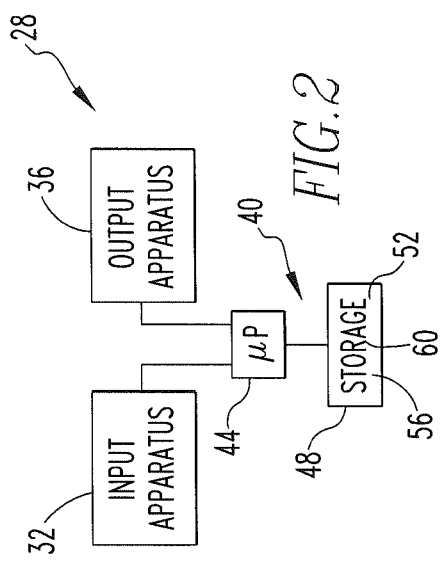
FIG. 2 is a schematic depiction of a control apparatus that can be used to perform aspects of the improved method.

As can be understood from FIG. 2, the control apparatus 28 which, in the depicted exemplary embodiment, is situated at the substation 8, can be said to include an input apparatus 32 and an output apparatus 36 that are connected with a processor apparatus 40. The input apparatus 32 sends input signals to the processor apparatus 40, and the output apparatus 36 receives output signals from the processor apparatus 40. The signals that are received by the input apparatus 32 are any telemetry, feedback, or other data inputs that are received from the voltage control devices 12, the distributed generators 16, the loads 20, and/or the sensors 24. The output signals that are output from the output apparatus 36 would be the control signals or other signals that are provided to the voltage control devices 12, the distributed generators 16, the loads 20, and/or the sensors 24.

The processor apparatus 40 includes a processor 44 and a storage 48 that are connected with one another. The processor can be any of a wide variety of processors, such as microprocessors and the like without limitation. The storage 48 can be any of a wide variety of storage media such as RAM, ROM, EPROM, EEPROM, FLASH, and the like that can be in the fashion of an internal storage area or a memory of a computer and can be a non-transitory storage medium, by way of example, and without limitation. The storage 48 has stored therein a number of routines 52 that are executable on the processor 44 to cause the control apparatus 28 to perform various functions. The routines 52 can be in any of a variety of forms such as instructions written in a computer language and the like that cause the processor 44 to perform various operations which, in turn, cause the control apparatus 28 to perform various operations. The number of routines 52 include a dynamic state engine routine 52.

The storage 48 further has stored therein a data set that includes a set of forecast data 56 and a set of historic data 60. By way of example, the forecast data 56 includes weather conditions and corresponding probabilities, such as the likelihood of sunny weather, clouds, barometric pressure, temperatures, and the like that are expected to occur in the vicinity of each of the distributed generators 16 at various times on a given day. The forecast data 56 can be derived from, for example, the next day's weather forecast or can be derived in any of a wide variety of fashions. The historic data 60 includes historic data for each of the distributed generators 16 and includes such data as any one or more of the rate at which power was produced at given times during each day, the weather conditions that were prevalent at those times, and any other information that may be of relevance in recording the electrical generation performance of the various distributed generators 16 from a historical standpoint. The historic data 60 therefore has time-based data, i.e., temporal data, having various values, and the temporal values can be used based upon an identified correspondence with a current time. For example, the historic data set 60 may be as simple as an average power production for a given calendar day, and the temporal value would simply be the calendar date for which the power production data has been recorded. Alternatively, for a given calendar date, the temporal values may additionally include data that is recorded on an hourly basis, or on a basis that more frequent or less frequent.

Regardless of how the historic data 60 is recorded, it is noted that all of the data, or at least a significant portion thereof, will typically be stored in association with various temporal values, and the temporal values can be correlated to current values such as dates and times in order to provide a historic estimation of what the performance of each of the distributed generators 16 has been in the past. By way of further example, a given temporal value may have several power production values associated with it depending upon the various weather conditions that have been in existence in the past when power production data was being recorded. For example, for a given date, the historic data 60 can include a data curve of power production for an entire day when the weather conditions are sunny, and this can be derived over the course of several years where on some years the weather was sunny on that day. The data can also include alternative curves for when the weather is moderately cloudy, fully cloudy, and the like and can also include other curves that show how the production varies with ambient temperature on such given days. In short, the historic data 60 can be any of a wide variety of types of data that have been compiled as reflecting the way in which each of the distributed generators 16 has performed in the past on various days, hours, minutes, and the like and under any of a variety of weather conditions, and it can be as simple or as comprehensive as needed.

The forecast data 56 can be used in conjunction with the historic data 60 in order to derive for each of the distributed generators 16 an expected effect of the distributed generator 16 on the electrical feeder 4. For example, the forecast data 56 may suggest that at the current time the prevailing weather in the vicinity of the distributed generator 16A should be sunny and have a temperature of 45 degrees Fahrenheit. The historic data 60 might be of sufficient detail that it would indicate that on the same date and at the same time in a situation where the weather is sunny and at the same temperature, the power output from the distributed generator 16A is at a certain value, say 20,550 kilowatts, by way of example. The forecast data 56 and the historic data 60 in such an exemplary situation would therefore suggest that the expected power production from the distributed generator 16A at such a time on such a date should be 20,550 watts. The dynamic state engine 52 can derive from the power production value an expected effect on the electrical feeder 4, such as an increase in the voltage at that location on the electrical feeder 4 of two volts.

Each of the distributed generators 16 can additionally include its own detection apparatus that detects weather conditions and that communicates it via a telemetry data link to the input apparatus 32 of the control apparatus 28. In such a situation, the detected weather conditions can be used to refine the expected power generation by any of the distributed generators 16.

Since the power output from the distributed generators 16 is variable, and since the amount of electrical power that is consumed by the loads 20 is also variable, the combined variability of power generation and power consumption can typically cause great variability in the voltage on the electrical feeder 4, hence the need for the voltage control devices 12. For example, if the distributed generator 16A is a 50 kilowatt photovoltaic array, and if the loads 20B and 20C are manufacturing facility that together consume 50 kilowatts, the combined variability to the electrical feeder 4 is 100 kilowatts. That is, on days when the distributed generator 16A is outputting 50 kilowatts but the loads 20B and 20C are not operational (such as on a holiday), the distributed generator 16A would theoretically be adding 50 kilowatts to the electrical feeder 4. On the other hand, on a completely cloudy day when the loads 20B and 20C are at their full power consumption, they would be consuming 50 kilowatts from the electrical feeder 4 without the distributed generator 16A generating any power at all. The difference between the plus 50 kilowatts and the minus 50 kilowatts is 100 kilowatts of total variability for the electrical feeder just from the distributed generator 16A and the loads 20B and 20C. Such variability in the power available on the electrical feeder 4 ordinarily requires that backup resources be made immediately available, such as generators that are already spinning but not online in order to meet excess need. If CVR is employed in such a situation, it typically is necessary to maintain voltage at a level higher than the minimum allowable voltage due to the potential that an additional load 20 could be brought online or a distributed generator 16 might suddenly reduce its electrical power production.

Advantageously, however, the disclosed and claimed concept overcomes some of the shortcomings in known electrical distribution systems by grouping together each of the distributed generators 16 with one or more of the loads 20, generally as long as the grouped loads 20 are capable of being controlled by the control apparatus 28. For instance, and as mentioned above, the distributed generator 16A might be a 50 kilowatt generator, and the loads 20B and 20B might together be a 50 kilowatt manufacturing facility which together might have a combined variability on the electrical feeder 4 of 100 kilowatts. However, by grouping together the 50 kilowatt generation by the distributed generator 16A with the 50 kilowatt consumption by the loads 20B and 20C, the net effect on the electrical feeder is zero. Such a zero net effect on the electrical feeder 4 is, of course, only when the consumption by the two loads 20B and 20C equals the electrical output by the distributed generator 16A. Advantageously, therefore, one more of the distributed generators 16 can have their power output monitored by the control apparatus 28 via telemetry communications between such distributed generators 16 and the control apparatus 28, and the electrical power consumption by one or more of the loads 20 can likewise be monitored via telemetry communications between the control apparatus 28 and the loads 20. Again, such communication links are not expressly depicted herein for reasons of simplicity of disclosure.

It is understood that certain of the loads 20 and/or certain of the distributed generators 16 may not be capable of such direct communication with the control apparatus 28. Therefore, the dynamic state engine routine 52 or other such routine 52 employs the data available to it from other locations on the electrical feeder 4 in order to dynamically group together the distributed generators 16 with the various loads 20 to optimally match the output of such distributed generators 16 with the consumption by the loads 20 that are grouped therewith.

Additionally, the loads 20 can advantageously be managed by the control apparatus 28 such that the power consumption by one or more of the group loads 20 can be reduced or eliminated as needed. For instance, one of the loads might include a swimming pool pump or an HVAC system or an electrical vehicle charging station or any of a variety of other types of loads. Such loads can be switched ON or OFF or can have their operational parameters adjusted depending upon a need to consume excess power or upon a need to reduce the consumption of power to correspond with the more or less instantaneous electrical generation by the distributed generator 16 that is grouped therewith. Also, the dynamic state engine routine 52, in its dynamic grouping and regrouping capability, is able to change the grouping of the various distributed generators 16 with the various loads 20 when needed if the variability in adjusting the power consumption is insufficient to match the needs of the distributed generator 16 that is currently grouped therewith.

FIG. 1 depicts an exemplary grouping of distributed generators 16 and loads 20 at a given instant in time. The distributed generator 16A is grouped with the loads 20B and 20C, the distributed generator 16B is grouped with the load 20D, the distributor generator 16C is grouped with the loads 20E, 20F, and 20G, and the distributed generator 16D is grouped with the load 20H. In the instant example, the distributed generator 16A does not have an independent telemetry connection with the control apparatus 28, but the load 20B does have a telemetry connection with the control apparatus 28, so the distributed generator 16A will generally always be grouped together with the load 20B. On the other hand, the distributed generator 16C has its own telemetry connection with the control apparatus 28, as does the load 20F, so while the two are grouped together in FIG. 1, such grouping can be dynamically undone, as is depicted in FIG. 3.

More particularly, FIG. 3 depicts another moment in time wherein the dynamic grouping amongst the distributed generators 16 and the loads 20 is different from that depicted in FIG. 1. For instance, FIG. 3 depicts the distributed generator 16 additionally being grouped together with the load 20A, and the distributed generator 16C is now grouped together with the load 20E instead of with the load 20F. Furthermore, the distributed generator 16B in FIG. 2 is now additionally grouped together with the loads 20C, 20F, and 20G. Between the time represented by FIG. 1 and the time represented by FIG. 3, the grouping between the distributed generator 16B and the load 20D appears to have not changed. It is understood, however, that the dynamic grouping between the distributed generator 16B and the load 20D may have changed between the two times, but the grouping is simply the same at the two times represented by FIGS. 1 and 3. In other words, the electrical generation and electrical consumption of any of the distributed generators 16 and any one or more of the loads 20, respectively, can vary at any given time, and the dynamic state engine routine 52 advantageously dynamically groups and regroups together the various distributed generators 16 and appropriate corresponding loads 20, and the dynamic state engine routine 52 additionally adjusts the power consumption of the loads 20 as needed, such that the net variability of power and thus voltage on the electrical feeder 4 is minimized.

Advantageously, therefore, when CVR is implemented on the electrical feeder 4, the voltage can advantageously be maintained by the voltage control devices 12 at the minimum voltage that is allowable. That is, whereas CVR implemented in previous systems required the voltage to be maintained at a level in excess of the minimum voltage in order to allow for variations in the loads and generators thereon in order to avoid having the voltage drop below the minimum allowable voltage, by advantageously dynamically grouping together the distributed generators 16 and the loads 20, the variability on the electrical feeder 4 has been minimized, thus permitting the CVR voltage to be maintained at or substantially at the minimum voltage. In this regard, it is understood that a certain amount of variability may still exist on the electrical feeder 4, and thus it may be necessary to implement CVR to maintain a voltage very slightly in excess of the minimum voltage, but such excess would be far closer to the minimum allowable voltage than the voltage at which CVR was capable of being implemented in the past. That is, by employing the dynamic grouping between distributed generators 16 and demand response loads 20 presented herein, and by controlling the electrical consumption of the various loads 20 or at least some of them, much of the variability that otherwise would exist on the electrical feeder 4 can be eliminated, and CVR thus can be implemented to maintain a voltage far closer to the minimum allowable voltage than would ever be possible with conventional electrical feeders.

Figure 4:
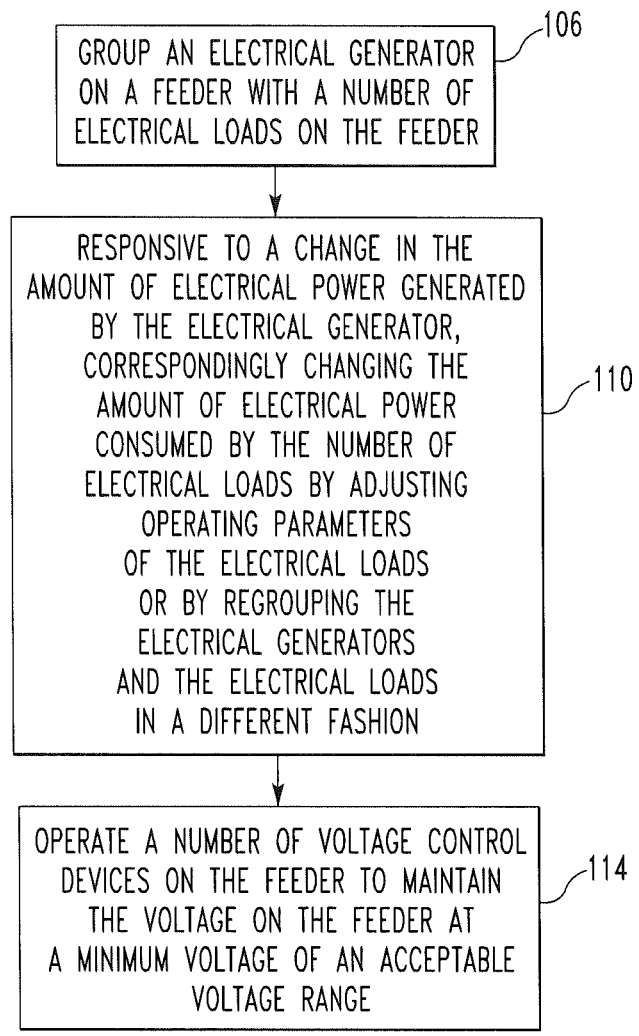
FIG. 4 is a flowchart depicting certain aspects of an improved method in accordance with an aspect of the disclosed and claimed concept.

FIG. 4 depicts an exemplary flowchart that demonstrates how an improved method in accordance with the disclosed and claimed concept could be implemented to permit CVR to be implemented at the minimum voltage that is permissible within a range of acceptable voltages. For instance, an electrical generator such as one of the distributed generators 16 can be grouped with a number of electrical loads such as the loads 20, as at 106. Then, as at 110, the control apparatus 20 can take certain steps in response to a change, i.e., an increase or a decrease, in the amount of power that is generated by the distributed generator 16 that had been grouped at 106. Specifically, this can be done by adjusting an operational parameter of one or more of the grouped electrical loads 20, such as by increasing its electrical consumption, decreasing its electrical consumption, or switching it between an ON state and an OFF state, by way of example. Alternatively or additionally, the grouped distributed generator 16 can be regrouped with additional or fewer or different loads 20 in order to match the power output from the distributed generator 16 with the electrical consumption by the loads 20 that have been regrouped with such distributed generator 16. Depending upon the nature of the distributed generator 16, it is possible that some of its characteristics could likewise be adjusted, such as by increasing or decreasing the amount of reactive and/or real power that is generated thereby. Still additionally or alternatively, it may be possible to adjust one or more of the voltage control devices 12 as needed, as at 114. Such operation of the voltage control devices 12 would advantageously cause the electrical feeder 4 in a CVR implementation to be operated at the minimum permissible voltage level, which reduces power consumption on purely resistive loads and reduces the resistive component of loads that have capacitive or inductive load components in addition to resistive components. As mentioned above, not only does this permit CVR to be implemented at the minimum voltage that is permissible within an acceptable voltage range, but it also permits fewer backup resources to be required to be available for more or less instantaneous connection with the electrical feeder 4. Such backup resources, if available, might otherwise be deployed, such as by offering such additional resources on the open electrical power market for supply elsewhere than on the electrical feeder 4. Other advantages will be apparent.

Further regarding the voltage control devices 12, it is possible that the proper functioning of such voltage control devices 12 may be difficult to discern on the electrical feeder 4 since the distributed generators 16 can, in a variable fashion, inject electrical power onto the electrical feeder 4. For example, the capacitor bank 12B or any of the other voltage control devices 12 may be instructed by the control apparatus 28 to adjust one or more of its operational parameters to result in an increase in the voltage on the electrical feeder 4 for whatever reason. For instance, if CVR is not being implemented on the electrical feeder 4, and rather the voltage on the electrical feeder 4 is simply desired to be increased by five volts, the control apparatus 28 may, at a first time, send an instruction via its output apparatus 36 to the capacitor bank 12B to change a number of its operational parameters to cause the voltage on the electrical feeder 4 to be increased by five volts for whatever reason. The capacitor bank 12B may execute the change to its operational parameters at a second time subsequent to the first time. If, at a third time subsequent to the second time, the voltage is detected by the sensor 24B to have increased by five volts, it is possible that at least a portion of the five volt increase in voltage may have come about because of an increase in electrical output by the distributed generators 16A or 16B, by way of example. That is, the presence of the distributed generators 16 complicates the determination of whether the observed effect on the voltage on the electrical feeder 4 was solely the result of the particular voltage control device 12 whose operational parameter was requested to be changed by the control apparatus 28, or whether it is at least partially the result of other changes to other devices that are electrically connected with the electrical feeder 4.

Advantageously, therefore, the forecast data 56 and, potentially, the historic data 60, may be employed to filter from the observed result that has occurred on the electrical feeder 4 the expected effect that any one or more of the distributed generators 16 would be expected to have had on the electrical feeder 4 at any given moment. That is, the forecast data 56 and/or the historic data 60 can be employed to estimate at any given time the power output that might be expected from any one or more of the distributed generators 16 at any given time in a fashion such as was set forth above. This can then be employed by the dynamic state generator routine 52 to determine an expected effect on the electrical power in the electrical feeder 4, such as in terms of the magnitude and/or phase angle of voltage and/or current. In accordance with another aspect of the disclosed and claimed concept, therefore, the forecast data 56 and/or the historic data 60 form a data set that may be used, at least in part, to filter the expected effects of one or more of the distributed generators 16 from the observed resultant effect on the electrical feeder 4 of an instructed change in an operational parameter of a voltage control device 12 in order to assess the actual net effect of the voltage control device 12 on the electrical feeder 4.

Figure 5:
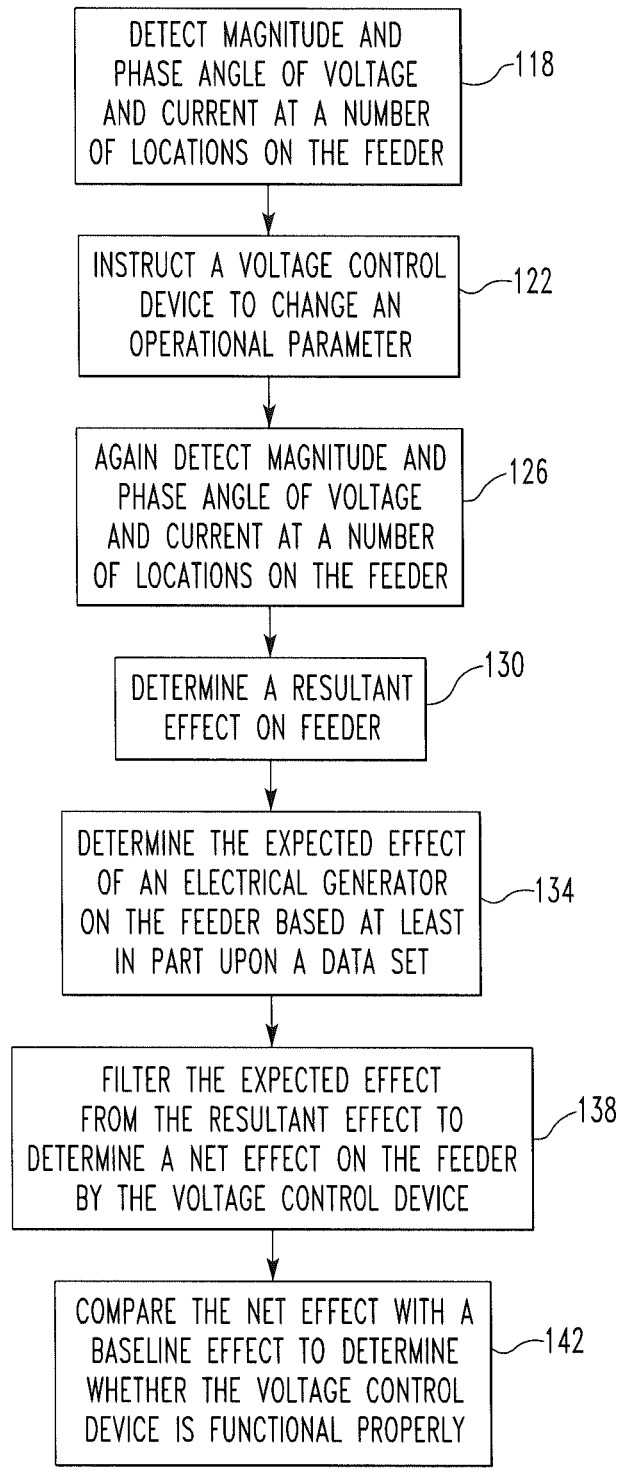
FIG. 5 is a flowchart depicting certain other aspects of an improved method in accordance with another aspect of the disclosed and claimed concept.

FIG. 5 is an exemplary flowchart that depicts certain aspects of the improved method. Processing can begin, as at 118, where at a first time the magnitude and phase angle of both the voltage and the current on the electrical feeder 4 can be detected at a number of locations. In particular, such locations would be the locations of connections of the sensors 24 with the electrical feeder, but additional locations can exist if any one or more of the other components connected with the electrical feeder 4, such as the voltage control devices 12, the distributed generators 16, and/or the loads 20, are capable of providing to the control apparatus 28 telemetry data regarding these parameters or other parameters of the electrical power on the electrical feeder 4 at such locations. As noted above, the additional telemetry connections between any such devices and the control apparatus 28 are not expressly depicted herein for purposes of simplicity of depiction and to avoid confusion. It is also noted that certain of the telemetry data potentially could be communicated along the electrical feeder 4 itself without departing from the present concept.

At a second time subsequent to the first time, a voltage control device 12 can then be instructed, as at 122, by the control apparatus 28 to change one or more of its operational parameters. Such a change in an operation parameter may be an adjustment in the operational parameter or may be a change in an operational parameter between an ON state and an OFF state, by way of example. Thereafter at a third time, as at 126, the magnitude and phase angle of the voltage and current at a number of locations on the electrical feeder 4 can again be detected. It can then be determined, as at 130, the resultant effect on the electrical feeder between the first time (at 19) and at the third time (126).

The forecast data 56 and/or the historic data 60 can then be evaluated, as at 134, to determine an expected effect on the electrical feeder 4 that could have been expected to occur as a result of power generation by any one or more of the various distributed generators 16, as at 134. In this regard, one or more of the distributed generators 16 may additionally include detection equipment (as suggested hereinbefore) that can detect one or more pertinent weather conditions or other conditions that are relevant to its generation of electrical power. For example, the photovoltaic array 16C might additionally include an illumination detector that would output a signal to the input apparatus 32 that is representative of the amount of sunlight that is impinging on the solar cells thereof and may additionally or alternatively include a temperature detector to ascertain the temperature of the cells in order to evaluate the thermal de-rate that occurs with increased temperatures on solar cells. Such additionally data could be employed to more accurately determine the expected power output of the distributed generator 16C or other such distributed generator 16 that is instrumented in such a fashion in order to determine the expected effect of such electrical generation on the electrical feeder 4. At 138, the expected effect that was determined at 134 can then be filtered from the resultant effect that was observed as at 130. This enables the determination, as at 138, of a net effect on the electrical feeder by the particular voltage control device 12 which, in the depicted example, is the capacitor bank 12B.

Once the net effect of the capacitor bank 12B on the electrical feeder 4 has been assessed, as at 138, it can then be determined, as at 142, whether the net effect is appropriate in view of the instruction at 122 that the voltage control device 12B make a change in its operational parameter. For instance, it is possible that the instruction from the control apparatus 28 was to have caused the capacitor bank 12B to change its state sufficiently that the voltage on the electrical feeder 4 would increase by five volts at that location. It is possible, however, that the net effect determined at 142 was that the capacitor bank 12B only had a net effect of increasing the voltage on the electrical feeder 4 by three volts. As such, and as at 142, the net effect of the exemplary three volts can be compared with a baseline effect for the capacitor bank 12B to determine whether the voltage control device, i.e., the capacitor bank 12B is operating properly. By way of example, the baseline effect that would have been expected in response to the instruction from the control apparatus 28 may have been that the capacitor bank 12B should have increased the voltage on the electrical feeder 4 by five volts, and thus the inquiry at 142 is whether the baseline expected result of an increase of five volts and the observed net effect of an increase of three volts is indicative of improper operation of the capacitor bank 12B. In this regard, it is possible that the capacitor bank 12B or any such voltage control device 12 is subject to variability based upon temperature changes or other such variables. Furthermore, it is possible that the capacitor bank 12B or any such voltage control device 12 may have aged since its initial installation and thus does not have the same performance as when new. Any of a variety of factors can be employed to determine at 142 from the net effect and the baseline effect whether the particular voltage control device 12 is operating properly.

If it is determined, as at 142, that the proper operation of the given voltage control device 12 is questionable, the first remedial step would be to protect the electrical feeder 4 by instructing one or more other voltage control devices 12 that are connected with the electrical feeder 4 to change one or more of their operational parameters in order to compensate for the loss in effectiveness of the capacitor bank 12B, by way of example. The next operation might be to issue an instruction that a technician physically evaluate the capacitor bank 12B or other such voltage control device 12 at its physical location, and potentially to replace it. Other appropriate operations can be envisioned.

The method that is depicted by the flowchart in FIG. 5 thus advantageously enables the effects of the distributed generators 16 to be filtered from the observed effect of a voltage control device 12 on the electrical feeder 4, which enables the net effect of the voltage control device 12 to be isolated to determine whether or not the voltage control device 12 is operating properly. Advantageously, therefore, this permits the voltage control devices 12 to be evaluated and replaced as needed prior to the electrical feeder 4 undergoing damage from failed voltage control. Other advantages will be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of operating an electrical feeder on which the voltage is to be maintained between a maximum voltage and a minimum voltage, the electrical feeder having electrically connected therewith a number of first devices which are operable to control the voltage on the electrical feeder, a number of second devices which generate varying amounts of electrical power that is contributed at least in part to the electrical feeder, and a number of third devices which are electrical loads, the electrical feeder further having electrically connected therewith a control apparatus that is in communication with at least some of at least one of the number of first devices, the number of second devices, and the number of third devices, the method comprising:

grouping a second device of the number of second devices with one or more third devices of the number of third devices;

operating the control apparatus to cause at least one first device of the number of first devices to maintain the voltage on the electrical feeder at the minimum voltage;

responsive to a decrease or an increase in the amount of electrical power that is being generated by the second device, operating the control apparatus to correspondingly decreasing or increasing, respectively, the consumption of electrical power by the one or more third devices by performing a number of operations that comprise at least one of:

adjusting an operating parameter of at least one third device of the one or more third devices to correspondingly decrease or increase, respectively, its power consumption, and further grouping the second device with at least one other third device of the number of third devices or ungrouping the second device from at least one third device of the one or more third devices to correspondingly adjust the aggregate power consumption of the third devices with which the second device is grouped.

2. The method of claim 1 wherein the number of operations further comprise ungrouping the second device from the one or more third devices, and then regrouping the second device with another one or more third devices of the number of third devices.

3. The method of claim 1, further comprising at least initially grouping each second device of the number of second devices with at least one third device of the number of third devices.

4. The method of claim 1, further comprising adjusting the operating parameter by adjusting an operational level of the at least one third device.

5. The method of claim 1, further comprising adjusting the operating parameter by the at least one third device between an ON state and an OFF state.

6. The method of claim 1, further comprising performing the grouping based at least in part upon a data set that comprises at least one of a historic data set that includes a historic electrical power generation value for the second device and a forecast data set that includes a value of at least a first weather parameter that is forecast to occur in the vicinity of the second device substantially when the grouping is performed.

7. The method of claim 6 wherein the historic electrical power generation value includes a temporal value that corresponds with when the grouping is performed, and further comprising employing the temporal value in the grouping.

8. The method of claim 6 wherein the historic electrical power generation value corresponds with a weather condition, and further comprising detecting the existence of the weather condition in the vicinity of the second device substantially when the grouping is performed.

9. A method of operating an electrical feeder on which the voltage is to be maintained between a maximum voltage and a minimum voltage, the electrical feeder having electrically connected therewith a number of voltage control devices, a number of electrical generation devices, and a number of electrical loads, the electrical feeder further having electrically connected therewith a control apparatus that is in communication with at least some of at least one of the number of voltage control devices, the number of electrical generation devices, and the number of electrical loads, the method comprising:
operating at least one voltage control device of the number of voltage control devices to maintain the voltage on the electrical feeder at the minimum voltage;
grouping an electrical generation device of the number of electrical generation devices with one or more electrical loads of the number of electrical loads based at least in part upon a data set that is available to the control apparatus;
responsive to a decrease or an increase in the amount of electrical power that is being generated by the electrical generation device, correspondingly decreasing or increasing, respectively, the consumption of electrical power by the one or more electrical loads by performing a number of operations that comprise at least one of:
adjusting an operating parameter of at least one electrical load of the one or more electrical loads to correspondingly decrease or increase, respectively, its power consumption, and
further grouping the electrical generation device with at least one other electrical load of the number of electrical loads to correspondingly decrease or increase, respectively, the aggregate power consumption of the one or more electrical loads.

10. The method of claim 9, further comprising performing the further grouping based at least in part upon the data set.

11. The method of claim 9, further comprising employing as the data set at least one of a historic data set that includes a historic electrical power generation value for the electrical generation device and a forecast data set that includes a value of at least a first weather parameter that is forecast to occur in the vicinity of the electrical generation device substantially when the grouping is performed.

12. The method of claim 11 wherein the historic electrical power generation value includes a temporal value that corresponds with when the grouping is performed, and further comprising employing the temporal value in the grouping.

13. The method of claim 11 wherein the historic electrical power generation value corresponds with a weather condition, and further comprising detecting the existence of the weather condition in the vicinity of the electrical generation device substantially when the grouping is performed.

14. A method of operating an electrical feeder on which the voltage is to be maintained between a maximum voltage and a minimum voltage, the electrical feeder having electrically connected therewith a number of voltage control devices, a number of electrical generation devices, and a number of electrical loads, the method comprising:
operating at least one voltage control device of the number of voltage control devices to maintain the voltage on the electrical feeder at the minimum voltage;
grouping an electrical generation device of the number of electrical generation devices with one or more electrical loads of the number of electrical loads;
responsive to a decrease or an increase in the amount of electrical power that is being generated by the electrical generation device, correspondingly decreasing or increasing, respectively, the consumption of electrical power by the one or more electrical loads by performing a number of operations that comprise at least one of:
adjusting an operating parameter of at least one electrical load of the one or more electrical loads to correspondingly decrease or increase, respectively, its power consumption, and
further grouping the electrical generation device with at least one other electrical load of the number of electrical loads to correspondingly decrease or increase, respectively, the aggregate power consumption of the one or more electrical loads.

* * * * *